US012785731B2

(12) United States Patent
Asuri et al.

(10) Patent No.: US 12,785,731 B2
(45) Date of Patent: Nov. 3, 2026

(54) LOCAL OSCILLATOR LEAKAGE DODGING

(71) Applicant: QUALCOMM Incorporated, San Diego, CA (US)

(72) Inventors: Bhushan Shanti Asuri, San Diego, CA (US); Ibrahim Ramez Chamas, Carlsbad, CA (US); Xiaotie Wu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 253 days.

(21) Appl. No.: 18/755,414

(22) Filed: Jun. 26, 2024

(65) Prior Publication Data

US 2026/0005711 A1 Jan. 1, 2026

(51) Int. Cl.
*H04B 1/04* (2006.01)

(52) U.S. Cl.
CPC .................................... *H04B 1/04* (2013.01)

(58) Field of Classification Search
CPC ....... H04B 1/04; H04B 1/0483; H04B 1/0475
See application file for complete search history.

(56) References Cited

U.S. PATENT DOCUMENTS 9,344,311 B2 * 5/2016 Nilsson ................ H04B 1/0475
9,614,554 B2 * 4/2017 Beidas ................. H04B 1/0475
11,515,901 B1 11/2022 Toosi et al.
12,301,268 B2 * 5/2025 Hsu ...................... H04B 1/0475
12,476,663 B2 * 11/2025 Braun .................. H04B 1/0053
2015/0139358 A1 5/2015 Asuri et al.
2021/0058165 A1 2/2021 Song et al.
2021/0399690 A1 * 12/2021 Panseri ..................... H03F 3/19

OTHER PUBLICATIONS

International Search Report and Written Opinion PCT/US2025/032028 ISA/EPO Oct. 7, 2025.

* cited by examiner

*Primary Examiner* — Curtis A Kuntz
(74) *Attorney, Agent, or Firm* — Dinsmore & Shohl LLP

(57) ABSTRACT

Certain aspects of the present disclosure provide techniques for local oscillator leakage dodging for a radio frequency (RF) transmitter. An example transmitter includes multiple transmit paths, wherein each of the transmit paths comprises a DAC; a mixer coupled to the DAC; and a PLL coupled to the mixer. The transmitter further includes a memory and a processor coupled to the memory. The processor is configured to provide, to the transmit paths, a plurality of first digital baseband signals corresponding to a plurality of RF carriers, when an instantaneous bandwidth of the plurality of RF carriers is different than an occupied bandwidth of the plurality of RF carriers; and provide, to a first transmit path of the transmit paths, one or more second digital baseband signals corresponding to one or more RF carriers, when an occupied bandwidth of the RF carrier(s) matches an instantaneous bandwidth of the RF carrier(s).

20 Claims, 6 Drawing Sheets

LOCAL OSCILLATOR LEAKAGE DODGING

INTRODUCTION

Field of the Disclosure

Aspects of the present disclosure relate to a radio frequency (RF) transmitter, and more particularly, to local oscillator leakage dodging for an RF transmitter.

Description of Related Art

Wireless communications systems are widely deployed to provide various telecommunication services such as telephony, video, data, messaging, broadcasts, etc. These wireless communications systems may employ multiple-access technologies capable of supporting communications with multiple users by sharing available wireless communications system resources with those users. Wireless communication devices may communicate RF signals via any of various suitable radio access technologies (RATs) including, but not limited to, 5G New Radio (NR), Evolved Universal Terrestrial Radio Access (E-UTRA), Code Division Multiple Access (CDMA), Time Division Multiple Access (TDMA), Wideband CDMA (WCDMA), Global System for Mobility (GSM), Bluetooth, Bluetooth Low Energy (BLE), ZigBee, wireless local area network (WLAN) RATs (e.g., Institute of Electrical and Electronics Engineers (IEEE) 802.11 specifications), any future RAT, and/or the like.

In certain cases, a wireless communications device is equipped with a RF transceiver (also referred to as an RF front-end) for communicating RF signals. In general, a baseband signal is modulated to convey information using a modulation technique, such as phase-shift keying (PSK) or any other suitable modulation technique. In a transmit mode, the RF transceiver is responsible for multiplexing the baseband signal with an RF carrier signal that is transmitted over the air (e.g., a wireless communication channel). Such an operation is called upconversion. In a receive mode, the RF transceiver converts a received RF signal to the baseband signal. Such an operation is called downconversion. The received baseband signal then can be demodulated into the information encoded at a transmitter. The RF transceiver may include a cascade of components in a transmit chain and a receive chain, respectively. The cascade of components may include, for example, one or more of attenuators, switches, couplers, filters, mixers, amplifiers, frequency synthesizers, oscillators, antenna tuners, duplexers, diplexers, detectors, etc.

Although there have been great technological advancements in RF circuitry over many years, challenges still exist. For example, RF circuitry can still encounter adjacent channel leakage or out-of-band emissions. Accordingly, there is a continuous desire to improve the technical performance of RF circuitry, such as suppression or elimination of adjacent channel leakage and/or out-of-band emissions.

SUMMARY

Some aspects provide a transmitter. The transmitter includes a plurality of transmit paths, wherein each transmit path of the plurality of transmit paths comprises one or more respective digital-to-analog converters (DACs); one or more respective mixers coupled to the one or more respective DACs; and a respective phase-locked loop (PLL) coupled to the one or more respective mixers. The transmitter further includes one or more memories. The transmitter also includes one or more processors coupled to the one or more memories. The one or more processors are configured to provide, to a set of the plurality of transmit paths, a plurality of first digital baseband signals corresponding to a plurality of radio frequency (RF) carriers, when an instantaneous bandwidth of the plurality of RF carriers is different than an occupied bandwidth of the plurality of RF carriers; and provide, to a first transmit path of the plurality of transmit paths, one or more second digital baseband signals corresponding to one or more RF carriers, when an occupied bandwidth of the one or more RF carriers matches an instantaneous bandwidth of the one or more RF carriers.

Some aspects provide a transmitter. The transmitter includes a first set of transmit paths and a second set of transmit paths. Each transmit path of the first set of transmit paths and the second set of transmit paths comprises one or more respective digital-to-analog converters (DACs); one or more respective mixers coupled to the one or more respective DACs; and a respective local oscillator coupled to the one or more respective mixers, wherein the respective local oscillator is configured to output a local oscillator signal. The transmitter further includes one or more memories and one or more processors coupled to the one or more memories. The one or more processors are configured to provide, to the first set of transmit paths and the second set of transmit paths, a multi-carrier digital baseband signal corresponding to a plurality of radio frequency (RF) carriers, wherein a first transmit path of the first set of transmit paths is configured to output a first signal with a first RF carrier of the plurality of RF carriers, and a second transmit path of the second set of transmit paths is configured to output a second signal with a second RF carrier of the plurality of RF carriers.

Some aspects provide a method for wireless communications via a transmitter. The method includes providing, to a set of a plurality of transmit paths, a plurality of first digital baseband signals corresponding to a plurality of radio frequency (RF) carriers, when an instantaneous bandwidth of the plurality of RF carriers is different than an occupied bandwidth of the plurality of RF carriers, wherein each transmit path of the plurality of transmit paths comprises: one or more respective digital-to-analog converters (DACs). The method further includes providing, to a first transmit path of the plurality of transmit paths, one or more second digital baseband signals corresponding to one or more RF carriers, when an occupied bandwidth of the one or more RF carriers matches an instantaneous bandwidth of the one or more RF carriers. The method further includes outputting at least one RF signal via at least one transmit path of the plurality of transmit paths.

Some aspects provide a method for wireless communications via a transmitter. The method includes providing, to a first set of transmit paths and a second set of transmit paths, a multi-carrier digital baseband signal corresponding to a plurality of radio frequency (RF) carriers, wherein a first transmit path of the first set of transmit paths is configured to output a first signal with a first RF carrier of the plurality of RF carriers, and a second transmit path of the second set of transmit paths is configured to output a second signal with a second RF carrier of the plurality of RF carriers, wherein each transmit path of the first set of transmit paths and the second set of transmit paths comprises: one or more respective digital-to-analog converters (DACs). The method further includes outputting at least one RF signal via the first set of transmit paths and the second set of transmit paths.

Other aspects provide: an apparatus operable, configured, or otherwise adapted to perform any one or more of the aforementioned methods and/or those described elsewhere herein; a non-transitory, computer-readable medium comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized in other aspects without specific recitation.

DETAILED DESCRIPTION

Figure 1:
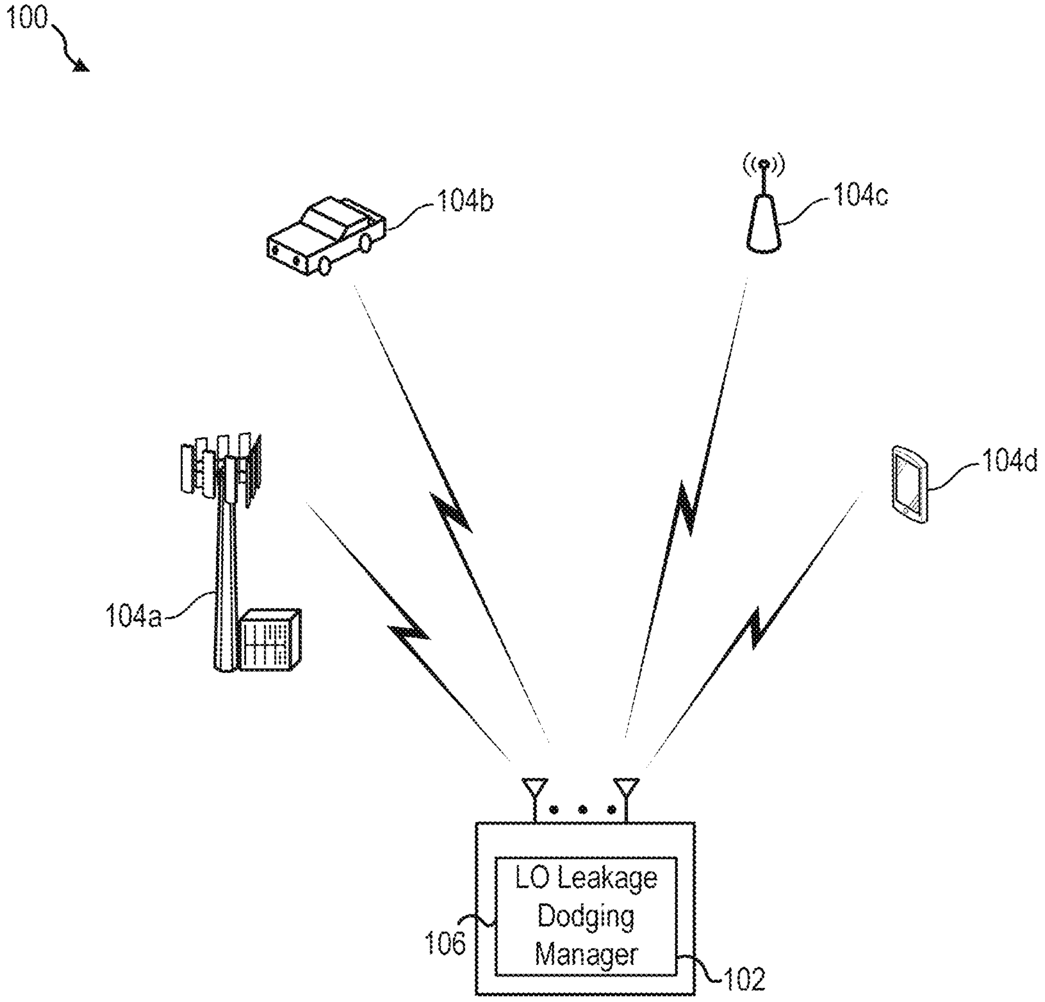
FIG. 1 depicts an example wireless communications system.

Aspects of the present disclosure provide apparatus, methods, processing systems, and computer-readable mediums for local oscillator (LO) leakage dodging for a radio frequency (RF) transmitter.

Certain regulatory agencies (e.g., the Federal Communications Commission (FCC)) and/or communications standards bodies (e.g., 3rd Generation Partnership Project (3GPP) and/or Electrical and Electronics Engineers (IEEE)) may regulate RF emissions of a transceiver in order to reduce RF interference encountered between wireless communications devices, for example, due to out-of-band emissions and/or spurious emissions output by the transceiver. Certain regulations and/or communications standards may specify a permissible amount of out-of-band emissions that can be part of the signal energy of a transmission output by certain RF equipment (such as a base station, access point, user equipment, etc.). As an example, operating band unwanted emissions (OBUE) may refer to out-of-band emissions of a transmission that are outside of an operating band plus a certain frequency range above and below the operating band. For example, 3GPP standards specify that a certain percentage (e.g., 99%) of the total integrated mean power of a transmitted spectrum is expected to be contained in a specific channel bandwidth (e.g., 5 MHz, 10 MHz, or the like) of an operating band, and IEEE 802.11 standards may specify a spectral mask that defines the permitted power distribution across a channel.

Technical problems for an RF transmitter include, for example, satisfying the RF emission specifications associated with wireless communications. In certain cases, an RF transmitter may transmit multi-carrier signals, for example, due to sparse carrier deployments of a network operator of a radio access network. As an example, a network operator of a wireless communications system may have licenses for a first carrier (e.g., having a bandwidth of 20 MHz) and a second carrier (e.g., having a bandwidth of 40 MHz), where a gap (e.g., 400 MHz) in the frequency domain is arranged between the first carrier and the second carrier. The instantaneous bandwidth (IBW) of a transmission may refer to the bandwidth of all of the frequency components of the transmission, and the occupied bandwidth (OBW) of the transmission may refer to the aggregate bandwidth over which a transceiver is actively communicating. The IBW of a multi-carrier transmission via the first carrier and the second carrier may be 460 MHz, whereas the OBW of the transmission may be 60 MHz. The network operator may expect to use an RF transmitter that is capable of transmitting RF signals in the first carrier and the second carrier simultaneously, for example, in order to enable massive multiple-input multiple-output (mMIMO) deployments and/or spectral efficiencies.

An RF transmitter may employ a local oscillator (LO) to provide an LO signal for upconversion mixing of a baseband signal to an RF carrier frequency. In certain cases, the RF transmitter may exhibit LO leakage by emitting at least a portion of the LO power from an antenna of the RF transmitter. For a multi-carrier signal where the OBW is less than the IBW, the RF transmitter may use a single LO signal for upconversion mixing to the first carrier and second carrier. In certain cases, the LO leakage may be exhibited as adjacent channel leakage and/or out-of-band emissions, for example, between the first carrier and second carrier. Thus, the LO leakage may prevent the RF transmitter from satisfying certain RF emission specifications.

Aspects described herein overcome the aforementioned technical problem(s), for example, by providing LO leakage dodging for an RF transmitter. In certain aspects, an RF transmitter may deconstruct a multi-carrier signal into separate component carriers, and each of the component carriers may be fed to a separate transmit path to reconstruct the multi-carrier signal via upconversion using local phase-locked loops (PLLs). The RF transmitter may include a local PLL per transmit path of a plurality of transmit paths. When a multi-carrier transmission has an IBW that is greater than an OBW, each of the local PLLs may provide a different LO signal for upconversion mixing in the bandwidth of a corresponding carrier of multiple carriers. As an example, a first PLL of the RF transmitter may output a first LO signal at a first frequency in the bandwidth of a first carrier, and a second PLL of the RF transmitter may output a second LO signal at a second frequency in the bandwidth of a second carrier. Thus, any LO leakage from the RF transmitter may be exhibited in the bandwidths of the first carrier and second carrier, respectively, to enable compliance with certain RF emission specifications, for example, due to the emissions forming in the operating band of the transmission In certain aspects, an RF transmitter may use a multi-carrier signal to feed separate transmit paths. For example, an RF transmitter may include a first transmit path and a second transmit path. Each of the first transmit path and the second transmit path may include an LO that outputs an LO signal for upconversion mixing in the bandwidth of a different carrier of the multi-carrier signal. Thus, any LO leakage from the RF transmitter may be exhibited in the bandwidths of the carriers of the multi-carrier signal to enable compliance with certain RF emission specifications.

Certain techniques for LO leakage dodging described herein may provide various beneficial technical effects and/or advantages. The techniques for LO leakage dodging may enable multi-carrier transmissions to satisfy certain RF emission specifications, for example, even when the IBW is greater than the OBW. The RF emission specifications may be satisfied due to generation of LO signals in the bandwidths of the multi-carrier signal without adjacent channel leakage, without out-of-band emissions, and/or with an acceptable level of adjacent channel leakage and/or out-of-band emissions. The techniques for LO leakage dodging may enable power savings for an RF transmitter, for example, due to the LO signal(s) being in the carrier bandwidth and allowing the relaxation of specifications for digital-to-analog converter (DAC) linearity, clock phase noise, and/or baseband analog circuitry linearity (e.g., baseband filter(s) and/or mixer(s)). The techniques for LO leakage dodging may allow an RF transmitter to support multi-carrier transmissions, for example, for mMIMO deployments, carrier aggregation, or the like.

Example Wireless Communications System

FIG. 1 illustrates an example wireless communications system 100 in which aspects of the present disclosure may be performed. For example, the wireless communications system 100 may include a wireless wide area network (WWAN) and/or a wireless local area network (WLAN). A WWAN may include a New Radio (NR) system (e.g., a Fifth Generation (5G) NR network), an Evolved Universal Terrestrial Radio Access (E-UTRA) system (e.g., a Fourth Generation (4G) network), a Universal Mobile Telecommunications System (UMTS) (e.g., a Second Generation (2G) or Third Generation (3G) network), a code division multiple access (CDMA) system (e.g., a 2G/3G network), any future WWAN system, or any combination thereof. A WLAN may include a wireless network configured for communications according to an Institute of Electrical and Electronics Engineers (IEEE) standard such as one or more of the 802.11 standards, etc. In some cases, the wireless communications system 100 may include a device-to-device (D2D) communications network or a short-range communications system, such as Bluetooth communications or near field communications (NFC).

As illustrated in FIG. 1, the wireless communications system 100 may include a first wireless device 102 communicating with any of various second wireless devices 104*a-d* (hereinafter "the second wireless device 104") via any of various radio access technologies (RATs), where a wireless device may refer to a wireless communications device. The RATs may include, for example, WWAN communications (e.g., E-UTRA and/or 5G NR), WLAN communications (e.g., IEEE 802.11), vehicle-to-everything (V2X) communications, non-terrestrial network (NTN) communications, short-range communications (e.g., Bluetooth), etc.

The first wireless device 102 may include any of various wireless communications devices including a user equipment (UE), a base station, a wireless station, an access point, customer-premises equipment (CPE), etc. In certain aspects, the first wireless device 102 includes a local oscillator (LO) leakage dodging manager 106 that controls a transmitter to output an RF signal with LO leakage dodging, in accordance with aspects of the present disclosure.

The second wireless device 104 may include, for example, a base station 104*a*, a vehicle 104*b*, an access point (AP) 104*c*, and/or a UE 104*d*. Further, the wireless communications systems 100 may include terrestrial aspects, such as ground-based network entities (e.g., the base station 104*a* and/or access point 104*c*), and/or non-terrestrial aspects, such as a spaceborne platform and/or an aerial platform, which may include network entities on-board (e.g., one or more base stations) capable of communicating with other network elements (e.g., terrestrial base stations) and/or user equipment.

The base station 104*a* may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. The base station 104*a* may provide communications coverage for a respective geographic coverage area, which may sometimes be referred to as a cell, and which may overlap in some cases (e.g., a small cell may have a coverage area that overlaps the coverage area of a macro cell). A base station may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

The first wireless device 102 and/or the UE 104*d* may generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. A UE may also be referred to more generally as a mobile device, a wireless device, a wireless communications device, a wireless station (STA), a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and other terms.

Figure 2:
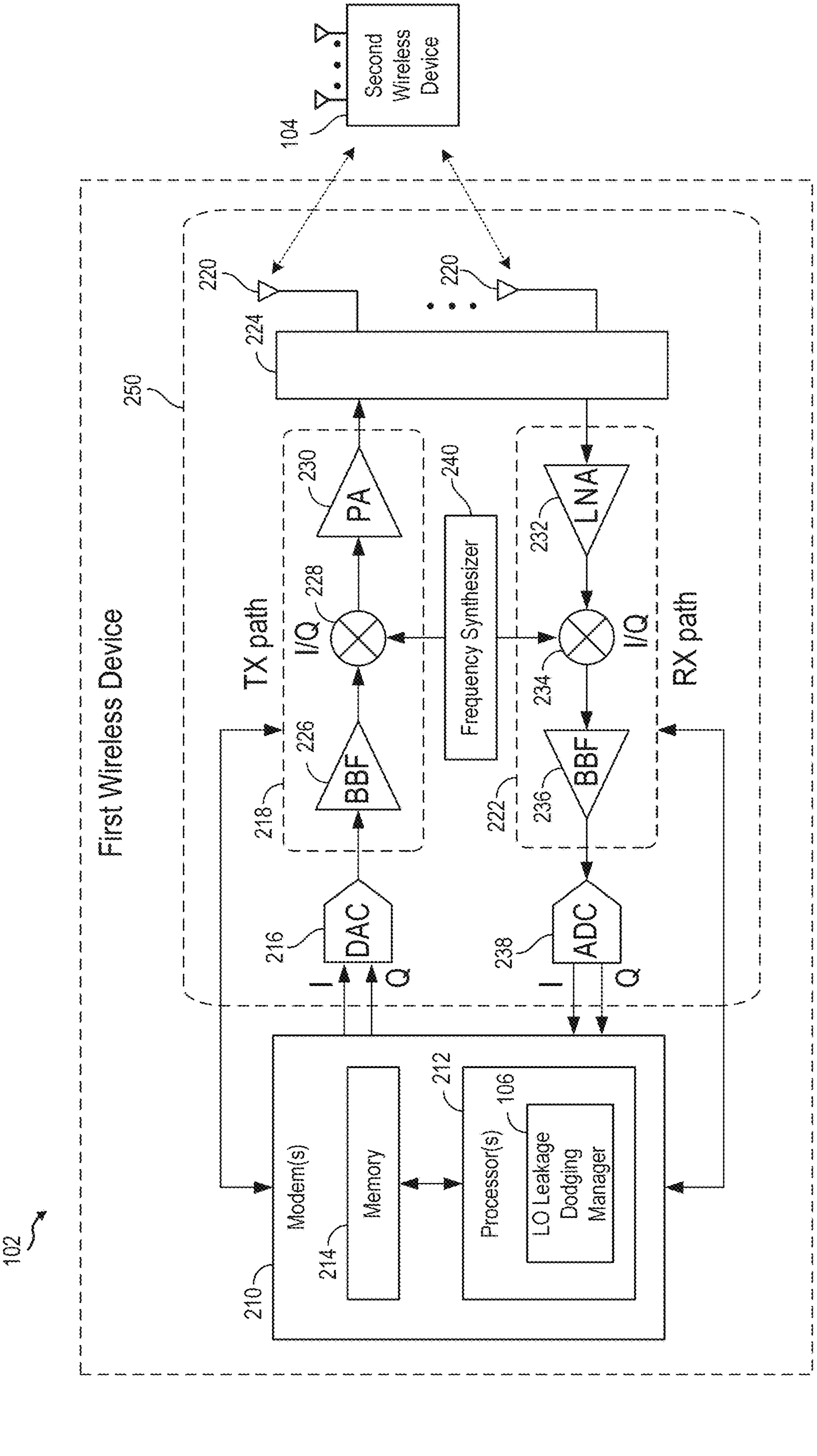
FIG. 2 depicts an example wireless communications device communicating with another device.

FIG. 2 illustrates example components of the first wireless device 102, which may be used to communicate with any of the second wireless devices 104.

The first wireless device 102 may be, or may include, a chip, system on chip (SoC), system in package (SiP), chipset, package, device that includes one or more modems 210 (hereinafter "the modem 210"). In some cases, the modem 210 may include, for example, any of a WWAN modem (e.g., a modem configured to communicate via E-UTRA 5G NR, and/or any future WWAN communications standards), a WLAN modem (e.g., a modem configured to communicate via IEEE 802.11 standards), a Bluetooth modem, a NTN modem, etc. In certain aspects, the first wireless device 102 also includes one or more RF transceivers (hereinafter "the RF transceiver 250"). In some cases, the RF transceiver 250 may be referred to as an RF front end (RFFE). In some aspects, the modem 210 further includes one or more processors, processing blocks or processing elements (hereinafter "the processor 212") and one or more memory blocks or elements (hereinafter "the memory 214"). In some cases, the processor 212 may implement and/or include the LO leakage dodging manager 106. In certain aspects, the processor 212 and/or the memory 214 are implemented external or otherwise separate from the modem 210.

In certain aspects, the processor 212 may process any of certain protocol stack layers associated with a radio access technology (RAT). For example, the processor 212 may process any of an application layer, packet layer, WLAN protocol stack layers (e.g., a link or a medium access control (MAC) layer), and/or WWAN protocol stack layers (e.g., a radio resource control (RRC) layer, a packet data convergence protocol (PDCP) layer, a radio link control (RLC) layer, and a MAC layer).

The modem 210 may generally be configured to implement a physical (PHY) layer. For example, the modem 210 may be configured to modulate packets and to output the modulated packets to the RF transceiver 250 for transmission over a wireless medium. The modem 210 is similarly configured to obtain modulated packets received by the RF transceiver 250 and to demodulate the packets to provide demodulated packets. In addition to a modulator and a demodulator, the modem 210 may further include digital signal processing (DSP) circuitry, automatic gain control (AGC), a coder, a decoder, a multiplexer, and/or a demultiplexer (not shown).

As an example, while in a transmission mode, the modem 210 may obtain data from a data source, such as an application processor. The data may be provided to a coder, which encodes the data to provide encoded bits. The encoded bits may be mapped to points in a modulation constellation (e.g., using a selected modulation and coding scheme) to provide modulated symbols. The modulated symbols may be mapped, for example, to spatial stream(s) or space-time streams. The modulated symbols may be multiplexed, transformed via an inverse fast Fourier transform (IFFT) block, and subsequently provided to DSP circuitry for transmit windowing and filtering. The digital signals may be provided to a digital-to-analog converter (DAC) 216. In certain aspects involving beamforming, the modulated symbols in the respective spatial streams may be precoded via a steering matrix prior to provision to the IFFT block.

The modem 210 may be coupled to the RF transceiver 250 by a transmit (TX) path 218 (also known as a transmit chain) for transmitting signals via one or more antennas 220 (hereinafter "the antennas 220") and a receive (RX) path 222 (also known as a receive chain) for receiving signals via the antennas 220. When the TX path 218 and the RX path 222 share the antennas 220, the paths may be coupled to the antennas 220 via an interface 224, which may include any of various suitable RF devices, such as a balun, a transformer, an antenna tuner, a switch, a duplexer, a diplexer, a multiplexer, and the like. As an example, the modem 210 may output digital in-phase (I) and/or quadrature (Q) baseband signals representative of the respective symbols to the DAC 216. In some examples, all or most of the elements illustrated as being included in the RF transceiver 250 are implemented in a single chip or die. For example, in some configurations, all of the elements of the RF transceiver except the antennas 220 are implemented on a single chip. In some other configurations, the interface 224 or a portion thereof is also omitted from the single chip.

Receiving I or Q baseband analog signals from the DAC 216, the TX path 218 may include a baseband filter (BBF) 226, a mixer 228 (which may include one or several mixers), and a power amplifier (PA) 230. The BBF 226 filters the baseband signals received from the DAC 216, and the mixer 227 mixes the filtered baseband signals with a transmit local oscillator (LO) signal to convert the baseband signal to a different frequency (e.g., upconvert from baseband to a radio frequency). In some aspects, the frequency conversion process produces the sum and difference frequencies between the LO frequency and the frequencies of the baseband signal. The sum and difference frequencies are referred to as the beat frequencies. Some beat frequencies are in the RF range, such that the signals output by the mixer 228 are typically RF signals, which may be amplified by the PA 230 before transmission by the antennas 220. The antennas 220 may emit RF signals, which may be received at the second wireless device 104. While one mixer 228 is illustrated, several mixers may be used to upconvert the filtered baseband signals to one or more intermediate frequencies and to thereafter upconvert the intermediate frequency signals to a frequency for transmission.

The RX path 222 may include a low noise amplifier (LNA) 232, a mixer 234 (which may include one or several mixers), and a baseband filter (BBF) 236. RF signals received via the antennas 220 (e.g., from the second wireless device 104) may be amplified by the LNA 232, and the mixer 234 mixes the amplified RF signals with a receive local oscillator (LO) signal to convert the RF signal to a baseband frequency (e.g., downconvert). The baseband signals output by the mixer 234 may be filtered by the BBF 236 before being converted by an analog-to-digital converter (ADC) 238 to digital I or Q signals for digital signal processing. The modem 210 may receive the digital I or Q signals and further process the digital signals, for example, demodulating the digital signals into information.

Certain transceivers may employ frequency synthesizers with a voltage-controlled oscillator (VCO) to generate a stable, tunable LO frequency with a particular tuning range. Thus, the transmit LO frequency may be produced by a frequency synthesizer 240, which may be buffered or amplified by an amplifier (not shown) before being mixed with the baseband signals in the mixer 228. Similarly, the receive LO frequency may be produced by the frequency synthesizer 240, which may be buffered or amplified by an amplifier (not shown) before being mixed with the RF signals in the mixer 234. Separate frequency synthesizers may be used for the TX path 218 and the RX path 222. In certain aspects, the TX path 218 may employ LO dodging as further described herein with respect to FIGS. 3 and 4.

While in a reception mode, the modem 210 may obtain digitally converted signals via the ADC 238 and RX path 222. As an example, in the modem 210, digital signals may be provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also may be coupled with the demodulator, which is configured to extract modulated symbols from the signal and, for example, compute the logarithm likelihood ratios (LLRs) for each bit position of each subcarrier in each spatial stream. The demodulator may be coupled with the decoder, which may be configured to process the LLRs to provide decoded bits. The decoded bits from all of the spatial streams may be fed to the demultiplexer for demultiplexing. The demultiplexed bits may be descrambled and provided to a medium access control layer (e.g., the processor 212) for processing, evaluation, or interpretation.

The modem 210 and/or processor 212 may control the transmission of signals via the TX path 218 and/or reception of signals via the RX path 222. In some aspects, the modem 210 and/or processor 212 may be configured to perform various operations, such as those associated with any of the methods described herein. The modem 210 and/or processor 212 may include a microcontroller, a microprocessor, an application processor, a baseband processor, a MAC processor, an artificial intelligence (AI) processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 214 may store data and program codes (e.g., processor-readable instructions) for performing wireless communications as described herein. In some cases, the memory 214 may be external to the modem 210 and/or processor 212 and/or incorporated therein (as illustrated with the memory 214 or being incorporated with the processor 212).

FIG. 2 shows an example transceiver design. It will be appreciated that other transceiver designs or architectures may be applied in connection with aspects of the present disclosure. For example, while examples discussed herein utilize I and Q signals (e.g., quadrature modulation), those of skill in the art will understand that components of the transceiver may be configured to utilize any other suitable modulation, such as polar modulation. As another example, circuit blocks may be arranged differently from the configuration shown in FIG. 2, and/or other circuit blocks not shown in FIG. 2 may be implemented in addition to or instead of the blocks depicted.

Example Local Oscillator Leakage Dodging

Aspects of the present disclosure provide techniques for LO leakage dodging that enable multi-carrier transmissions to satisfy certain RF emission specifications, for example, even when the IBW is greater than the OBW.

Figure 3:
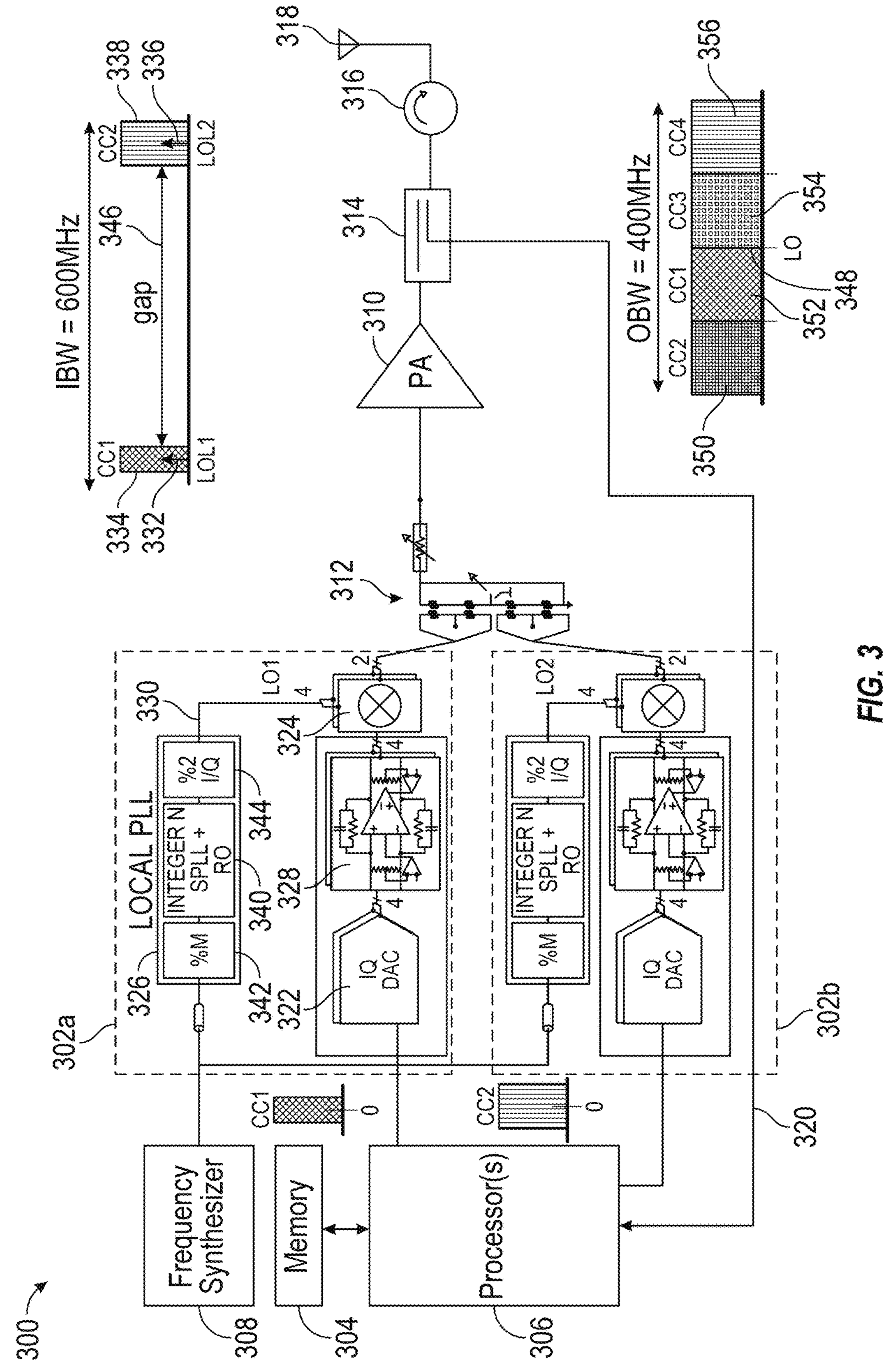
FIG. 3 depicts an example architecture of an RF transmitter that employs local oscillator (LO) leakage dodging.

FIG. 3 depicts an example architecture of an RF transmitter 300 that employs LO leakage dodging. The RF transmitter 300 may be configured to perform upconversion mixing with LO signal(s) in the bandwidth(s) of RF carrier (s). Such LO leakage dodging may allow the RF transmitter 300 to comply with certain RF emission specifications as described herein, for example, when transmitting a multi-carrier signal with an IBW greater than OBW.

In this example, the RF transmitter 300 includes a plurality of transmit paths (e.g., including the first transmit path 302*a* and the second transmit path 302*b*), one or more memories 304 (hereinafter "the memory 304"), and one or more processors 306 (hereinafter "the processor 306"). The processor 306 may be an example of the processor 212 and/or the modem 210 of FIG. 2. The memory 304 may be an example of the memory 214 of FIG. 2. In certain aspects, the memory 304 may store data and/or program codes (e.g., processor-readable instructions) that when executed perform the LO leakage dodging operations described herein. Note that the RF transmitter may include two or more transmit paths depending on the total number of RF carriers output at or by the RF transmitter 300. In certain aspects, the RF carriers output by or at the RF transmitter 300 may be power combined on-chip to reconstruct the expected component carrier configuration provided by the processor 306, as further described herein.

In certain aspects, the RF transmitter 300 may further include a frequency synthesizer 308, a PA 310, an RF combiner 312, an RF coupler 314, a circulator 316, and/or an antenna 318. The PA 310 may be an example of the PA 230 of FIG. 2, and the antenna 318 may be an example of the antenna 220 of FIG. 2. The RF combiner 312 may be or include a diplexer, a multiplexer, and/or a power combiner that combines RF signals into a multi-carrier RF signal to feed the PA 310. The RF coupler 314 may selectively couple the output of the PA 310 to the processor 306 via a feedback path 320 for certain digital signal processing operations, such as calibration (e.g., DC offset calibration, distortion and/or harmonic suppression, etc.) and/or digital pre-distortion (DPD). In certain aspects, the circulator 316 may be an example of a duplexer that feeds the RF signal to the antenna 318 for transmission (additionally or alternatively, other duplexer types may be possible). While the RF coupler 314 and the circulator 316 are shown, it should be appreciated that these are examples, and these components could be optional in an RF transmitter, such as the RF transmitter 300. In certain cases, there may be additional or alternative components arranged between the output of the PA 310 and the antenna 318.

The plurality of transmit paths 302*a*, 302*b* may be used to generate a multi-carrier signal without out-of-band emissions or with reduced out-of-band emissions that complies with certain RF emission specifications as described herein. Each transmit path of the plurality of transmit paths 302*a*, 302*b* includes one or more respective DACs (hereinafter "the DAC 322"), one or more respective mixers (hereinafter "the mixer 324"), and a respective local phase-locked loop (PLL) 326. The DAC 322 may be an example of the DAC 216 of FIG. 2, and the mixer 324 may be an example of the mixer 228 of FIG. 2.

In certain aspects, each transmit path of the plurality of transmit paths 302*a*, 302*b* may further include one or more baseband filters (hereinafter "the BBF 328"). The BBF 328 may be coupled between the DAC 322 and the mixer 324. The BBF 328 may be an example of the BBF 226 of FIG. 2. In certain aspects, each transmit path of the plurality of transmit paths 302*a*, 302*b* (or a subset thereof) may have in-phase and quadrature signal paths. For example, at least one transmit path of the plurality of transmit paths 302*a*, 302*b* may include an in-phase signal path and a quadrature signal path with a DAC, BBF, and mixer per signal path.

In certain aspects, the transmit paths 302*a*, 302*b* may support RF signal transmission in various OBWs. In certain cases, the transmit paths may support different OBWs. As an example, a single transmit path (e.g., the first transmit path 302*a*) may support a first OBW, and other transmit path(s) (e.g., the second transmit path 302*b*) may support a second OBW, where the first OBW may be greater than the second OBW. The first transmit path 302*a* may be configured to output one or more first RF signals with a first peak bandwidth (e.g., a first peak OBW), and the second transmit path 302*b* may be configured to output one or more second RF signals with a second peak bandwidth (e.g., a second peak OBW) different from the first peak bandwidth. The first peak bandwidth may be greater than the second peak bandwidth. The first peak bandwidth may be the peak bandwidth supported by the first transmit path 302*a*, and the second peak bandwidth may be the peak bandwidth supported by the second transmit path 302*b*. In certain cases, the first transmit path 302*a* may be referred to as a master transmit path to reflect that the first transmit path 302*a* supports a greater OBW than another transmit path, such as the second transmit path 302*b*. In certain cases, the first OBW may be or include a peak OBW supported by the RF transmitter 300, for example, among the transmit paths. In certain aspects, the transmit paths may support the same OBW.

The DAC 322 is coupled to the mixer 324, and the mixer 324 is coupled to the PLL 326 and obtains an LO signal from the PLL 326 via first signal path 330. The DAC 322 feeds an analog baseband signal to the mixer 324, and the PLL 326 feeds an LO signal to the mixer 324. The mixer 324 mixes the baseband signal with the LO signal to form an RF carrier signal through a process referred to as upconversion (e.g., essentially multiplying the LO signal with the baseband signal).

The PLL 326 may be configured to output a LO signal in a bandwidth of an RF carrier. When the plurality of transmit paths 302*a*, 302*b* are used to generate a multi-carrier signal with a plurality of RF carriers, each PLL 326 of the plurality of transmit paths 302*a*, 302*b* (or a subset thereof depending on total number of carriers) may be configured to output a respective LO signal in a different bandwidth of the plurality of RF carriers. Each PLL 326 of the plurality of transmit paths 302*a*, 302*b* (or a subset thereof) may output an LO signal at a different frequency for the upconversion mixing performed by the respective mixer 324.

As an example, the PLL 326 of the first transmit path 302*a* may generate a first LO signal 332 in a first bandwidth of a first RF carrier 334, and the PLL of the second transmit path 302*b* may generate a second LO signal 336 in a second bandwidth of a second RF carrier 338. Accordingly, any LO leakage may be exhibited in the bandwidths of the first RF carrier 334 and the second RF carrier 338 allowing the RF transmitter 300 to comply with certain RF emission specifications as described herein even when the multi-carrier signal has an IBW that is greater than OBW. In certain aspects, the LO signal being formed in the bandwidth of the RF carrier may enable power savings for the RF transmitter 300, for example, due to relaxation of certain specifications for the clock phase noise and/or the linearity of the DAC 322, the BBF 328, and/or the mixer 324.

The PLL 326 may include a feedback loop that detects the phase difference of the output signal and input signal with a phase detector. The output of the phase detector may then be passed through a low-pass filter to provide a control signal to a voltage controlled oscillator (VCO), which outputs an LO signal. The PLL 326 may be or include an integer-N PLL 340. In certain aspects, the PLL 326 may further include a first frequency divider 342 and a second frequency divider 344. The integer-N PLL 340 may be coupled between the first frequency divider 342 and the second frequency divider 344. The first frequency divider 342 may be or include an integer or a fractional frequency divider, and the second frequency divider 344 may be or include an integer or fractional frequency divider, such as a divide-by-two frequency divider. The first frequency divider 342 may obtain an input signal and generate an output signal at a frequency scaled based on a division ratio. The first frequency divider 342 may feed a reference signal to the integer-N PLL 340, and the integer-N PLL 340 may feed an output signal to the second frequency divider 344. The second frequency divider 344 may feed the LO signal to the mixer 324. In certain aspects, the integer-N PLL 340 may be or include a ring-oscillator (RO)-based PLL and/or a sampling PLL. With respect to a sampling PLL, the frequency of the input signal (e.g., sampled clock) may be equal to the reference frequency at the locking state of a VCO of the PLL. In certain aspects, the PLL 326 may be an example of any of the PLLs of the transmit paths 302*a*, 302*b*.

The frequency synthesizer 308 may be coupled to at least one PLL 326 of the plurality of transmit paths 302*b*, 302*a*. In certain aspects, the frequency synthesizer 308 may be coupled to each PLL 326 of the plurality of transmit paths 302*b*, 302*a*. The frequency synthesizer may be configured to provide a signal at a reference frequency to the PLL(s) 326 of the plurality of the transmit paths 302*b*, 302*a*. For example, the frequency synthesizer 308 may feed the signal to the first frequency divider 342 of the PLL 326 of the first transmit path 302*a*. In certain cases, the RF transmitter 300 may include multiple frequency synthesizers. For example, each frequency synthesizer may feed a signal at a reference frequency to one or more transmit paths.

Depending on the IBW and OBW of the RF signal(s) output by the RF transmitter 300, the processor 306 may effectively output digital baseband signal(s) in one of two modes. In a first mode, the processor 306 may output multiple baseband signals to the plurality of transmit paths 302*a*, 302*b* (or a subset thereof) when the IBW (e.g., 600 MHz) of the RF signal is greater than the OBW (e.g., 60 MHz) of the RF signal(s); and in a second mode, the processor 306 may output one or more baseband signals to a single transmit path (e.g., the first transmit path 302*a*) when the IBW (e.g., 400 MHz) of the RF signal(s) matches the OBW (e.g., 400 MHz) of the RF signal(s).

As an example of the first mode, the processor 306 may provide, to a set of the plurality of transmit paths 302*a*, 302*b* (e.g., a subset or all of the transmit paths), a plurality of digital baseband signals corresponding to a plurality of RF carriers, when an IBW of the plurality of RF carriers is different than (or from) an OBW of the plurality of RF carriers (e.g., when the IBW is greater than the OBW). The processor 306 may provide, to each DAC 322 of the set of the plurality of transmit paths (302*a*, 302*b*), a set of digital baseband signals per RF carrier of the plurality of RF carriers. As described herein, each PLL 326 of the set of the plurality of transmit paths 302*a*, 302*b* may be configured to output a respective LO signal in a different bandwidth of the plurality of RF carriers to enable the LO leakage dodging giving rise to certain technical beneficial effect(s), such that there may be no adjacent channel leakage and/or out-of-band emissions from the LO signal(s), and certain RF emission specifications may be satisfied due to the LO leakage dodging.

As an example, the processor 306 may provide, to the DAC 322 of the first transmit path 302*a*, a first set of digital baseband signals corresponding to a first RF carrier 334, and the processor 306 may provide, to the DAC 322 of the second transmit path 302*b*, a second set of digital baseband signals corresponding to a second RF carrier 338. The processor 306 may be configured to provide, for each of the set of the plurality of transmit paths (302*a*, 302*b*), a set of digital baseband signals (e.g., complex quadrature baseband signals) of the plurality of digital baseband signals to the respective DAC 322. In certain aspects, the plurality of RF carriers may include a first RF carrier 334 and a second RF carrier 338, and a gap 346 may be arranged in a frequency domain between bandwidths of the first RF carrier 334 and the second RF carrier 338.

As an example of the second mode, the processor 306 may provide, to the first transmit path 302*a* of the plurality of transmit paths (302*a*, 302*b*), one or more digital baseband signals corresponding to one or more RF carriers, when the OBW of the one or more RF carriers matches the IBW of the one or more RF carriers. The PLL 326 of the first transmit path 302*a* may be configured to output a LO signal 348 in the OBW of the one or more RF carriers and enable certain technical beneficial effect(s). As an example, the processor 306 may provide, to the DAC 322 of the first transmit path 302*a*, the digital baseband signal(s) corresponding to a plurality of RF carriers. The plurality of RF carriers may include a third RF carrier 350, a fourth RF carrier 352, a fifth RF carrier 354, and a sixth RF carrier 356. In certain aspects, the RF combiner 312 may include a switch that controls which transmit path of the plurality of the transmit paths feeds the PA 310. As an example, for the second mode, the RF combiner 312 may only allow the output from the first transmit path 302*a* to be fed to the PA 310. Accordingly, for the second mode, the LO signal may be arranged in the OBW of the RF carriers, such that there may be no adjacent channel leakage and/or out-of-band emissions from the LO signal, and certain RF emission specifications may be satisfied due to the LO leakage dodging. Further, the multi-mode operation of the RF transmitter 300 may allow robust operational states of the RF transmitter 300 to satisfy the RF emission specifications regardless of the IBW and OBW of the RF signal(s) output by the RF transmitter 300.

In certain aspects, the processor 306 may perform digital domain reconstruction and/or deconstruction of the baseband signals. In the first mode, the processor 306 may generate a multi-carrier digital baseband signal that corresponds to the RF carriers of the RF signal output by the RF transmitter 300 for multi-carrier processing, and the processor 306 may deconstruct the multi-carrier baseband signal into a carrier-specific digital baseband signal per RF carrier of the RF carriers. As an example, the processor 306 may perform multi-carrier DPD based on the multi-carrier digital baseband signal, which may be deconstructed into carrier-specific baseband signals. When performing DPD in the first mode, the processor 306 may obtain input including digital baseband signals corresponding to each of the RF carriers. For example, the processor may obtain a first digital baseband signal corresponding to the first RF carrier and a second digital baseband signal corresponding to the second RF carrier, and the processor 306 may output carrier-specific digital baseband signals that compensate for the non-linear effects of the respective transmit paths 302*a* and/or the PA 310. The processor 306 may reconstruct the multi-carrier baseband signal based on the carrier-specific digital baseband signals, and the processor 306 may perform multi-carrier operations, such as distortion and/or harmonic suppression, DC offset calibration, or the like. The processor 306 may, then, deconstruct the multi-carrier baseband signal into the carrier-specific digital baseband signals and feed such carrier-specific digital baseband signals to the respective DAC 322 of the plurality of transmit paths 302*a*, 302*b* (or a subset thereof) as described herein.

In the second mode, the processor 306 may perform wideband processing of the multi-carrier digital baseband signal without multi-carrier reconstruction and/or carrier deconstruction operations. As an example, the processor 306 may perform wideband DPD, distortion and/or harmonic suppression, DC offset calibration, or the like on the multi-carrier digital baseband signal.

Figure 4:
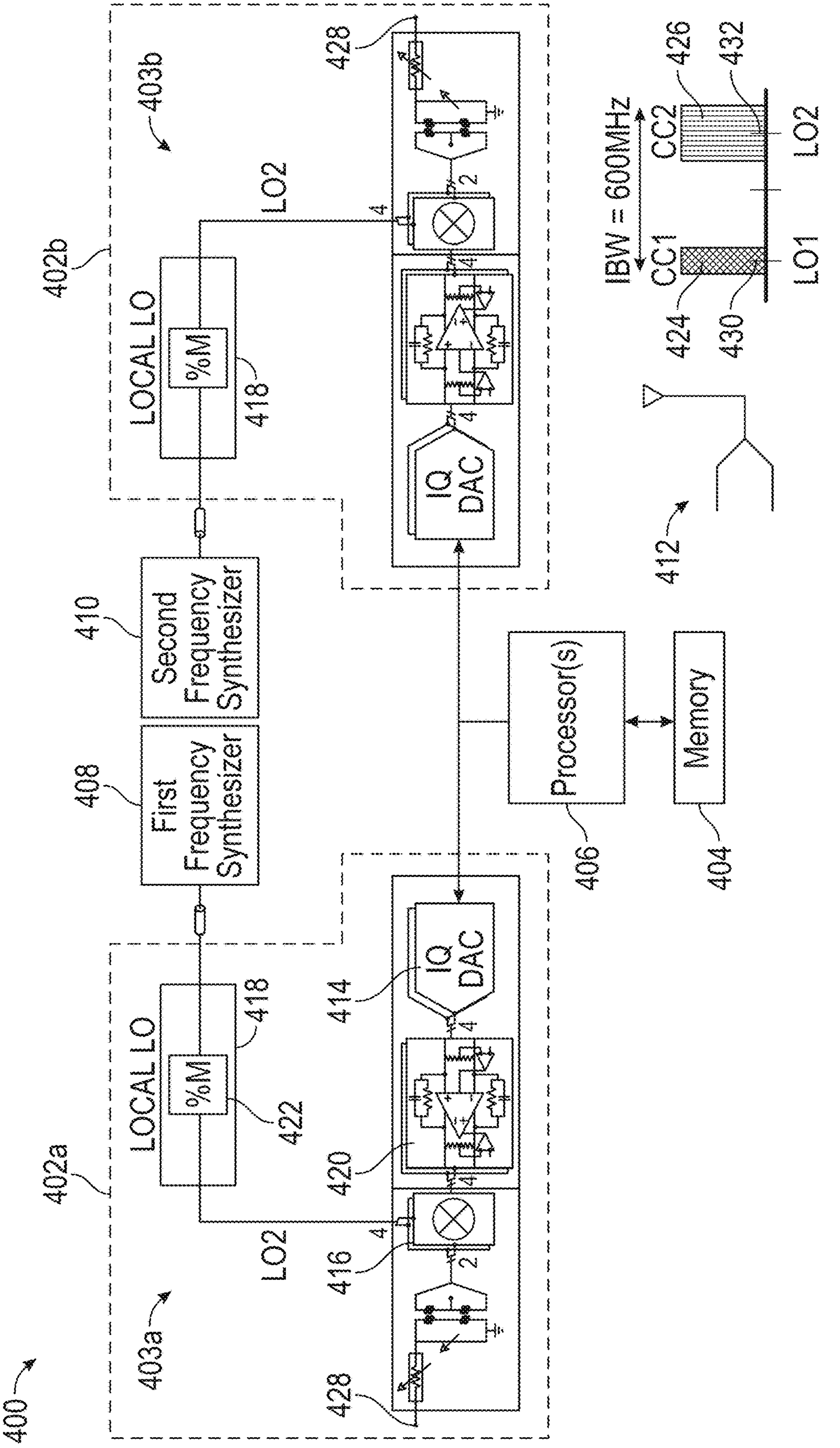
FIG. 4 depicts another example architecture for an RF transmitter that employs LO leakage dodging.

FIG. 4 depicts another example architecture for an RF transmitter 400 that employs LO leakage dodging. In this example, the RF transmitter 400 includes a first set of transmit paths 402*a*, a second set of transmit paths 402*b*, one or more memories (hereinafter "the memory 404"), and one or more processors (hereinafter "the processor 406"). The processor 406 may be an example of the processor 212 and/or the modem 210 of FIG. 2. The memory 404 may be an example of the memory 214 of FIG. 2. In certain aspects, the memory 404 may store data and/or program codes (e.g., processor-readable instructions) that when executed perform LO leakage dodging operations described herein. In certain aspects, the RF transmitter 400 may further include a first frequency synthesizer 408, a second frequency synthesizer 410, and at least one RF power combiner 412 (e.g., RF combiner). In certain aspects, a similar architecture of the RF transmitter 400 may be applied to a receiver. In certain aspects, the RF carriers may be combined off-chip, for example, by or at the RF power combiner 412 to reconstruct the expected component carrier configuration provided by the processor 406.

The first set of transmit paths 402*a* may include one or more transmit paths (e.g., including a first transmit path 403*a*), and the second set of transmit paths 402*b* may include one or more transmit paths (e.g., including a second transmit path 403*b*). Each transmit path of the first set of transmit paths 402*a* and the second set of transmit paths 402*b* may include one or more respective DACs (hereinafter "the DAC 414"), one or more respective mixers (hereinafter "the mixer 416"), and a respective LO 418. Each transmit path of the first set of transmit paths 402*a* and the second set of transmit paths 402*b* may further include one or more baseband filters (hereinafter "the BBF 420"). The BBF 420 may be coupled between the DAC 414 and the mixer 416. The BBF 420 may be an example of the BBF 226 of FIG. 2.

The first set of transmit paths 402*a* may be driven by the first frequency synthesizer 408, and the second set of transmit paths 402*b* may be driven by the second frequency synthesizer 410. The first frequency synthesizer 408 may be coupled to at least one LO 418 of the first set of transmit paths 402*a*. In certain cases, the first frequency synthesizer 408 may be coupled to each LO 418 of the first set of transmit paths 402*a* (or a subset thereof). The second frequency synthesizer 410 may be coupled to at least one LO 418 of the second set of transmit paths 402*b*. In certain cases, the second frequency synthesizer 410 may be coupled to each LO 418 of the second set of transmit paths 402*b* (or a subset thereof). The first frequency synthesizer 408 may feed a first signal at a first reference frequency to each LO 418 of the first set of transmit paths 402*a* (or a subset thereof), and the second frequency synthesizer 410 may feed a second signal at a second reference frequency to each LO 418 of the second set of transmit paths 402*b* (or a subset thereof). In certain aspects, the LO(s) of the first set of transmit paths 402*a* may have the same or a different architecture than the LO(s) of the second set of transmit paths 402*b*. In certain aspects, the LO 418 may employ fewer circuit components than the PLL 326 of FIG. 3, and thus, the LO 418 may occupy a smaller circuit footprint compared to the PLL 326 of FIG. 3. Accordingly, the RF transmitter 400 may perform the LO leakage dodging as described herein with less hardware compared to the RF transmitter 300, which may enable reduced complexity, reduced power consumption, and/or cost savings.

The DAC 414 may be coupled to the mixer 416, and the LO 418 may be coupled to the mixer 416. The DAC 414 may feed an analog baseband signal to the mixer 416, and the LO 418 may feed an LO signal to the mixer 416 to upconvert the analog baseband signal to an RF carrier signal. The LO 418 may be configured to output an LO signal in a bandwidth of an RF carrier. In certain aspects, for each transmit path of the first set of transmit paths 402*a* and the second set of transmit paths 402*b*, the respective LO 418 may be configured to output a LO signal 430, 432 in a different bandwidth of a plurality of RF carriers (e.g., a first RF carrier 424 and a second RF carrier 426, respectively) associated with an RF output signal, and thus, enabling certain technical beneficial effect(s). In certain aspects, each LO 418 of the first set of transmit paths 402*a* (or a subset thereof) and/or the second set of transmit paths 402*b* (or a subset thereof) may include a frequency divider 422, such as an integer or a fractional frequency divider. Accordingly, the LO signals may be arranged in the OBW of the RF carrier(s), such that there may be no adjacent channel leakage and/or out-of-band emissions from the LO signals, and certain RF emission specifications may be satisfied due to the LO leakage dodging.

In this example, the processor 406 may selectively output digital baseband signal(s) to the first set of transmit paths 402*a*, the second set of transmit paths 402*b*, or a combination thereof, depending on the IBW and OBW of the RF signal(s) output by the RF transmitter 400. In a first mode, the processor 406 may output multi-carrier digital baseband signal(s) to the first set of transmit paths 402*a* and the second set of transmit paths 402*b* when the IBW is different than (or from) the OBW of the RF transmitter. For example, the processor 406 may be configured to provide, to the first set of transmit paths 402*a* and the second set of transmit paths 402*b*, a multi-carrier digital baseband signal corresponding to a plurality of RF carriers including, for example, a first RF carrier 424 and a second RF carrier 426. A first transmit path 403*a* of the first set of transmit paths 402*a* may be configured to output a first signal with a first RF carrier 424 of the plurality of RF carriers, and a second transmit path 403*b* of the second set of transmit paths 402*b* may be configured to output a second signal with a second RF carrier 426 of the plurality of RF carriers. The RF power combiner 412 may be coupled between the outputs 428 of the first transmit path 403*a* and the second transmit path 403*b*, respectively. For example, each of the first transmit path 403*a* and the second transmit path 403*b* may feed a respective RF signal to the RF power combiner 412, and the RF power combiner 412 may combine the RF signals to form a multi-carrier RF signal.

In a second mode, the processor 406 may output digital baseband signal(s) to a transmit path of the first set of transmit paths 402*a* or the second set of transmit paths 402*b*, for example, when the IBW matches the OBW. As an example, the processor 406 may output digital baseband signal(s) to the first transmit path 403*a* of the first set of transmit paths 402*a*, when the IBW matches the OBW.

In certain aspects, the processor 406 may perform multi-carrier signal processing, such as multi-carrier DPD, distortion and/or harmonic suppression, DC offset calibration, or the like. For example, the processor 406 may perform multi-carrier DPD based on the multi-carrier digital baseband signal. In certain aspects, the RF transmitter 400 may enable reduced processing latency for the processor 406 during the first mode, for example, due to the multi-carrier digital baseband signal being generated. For example, the processor 406 may perform certain multi-carrier signal processing without digital domain reconstruction and/or deconstruction of the baseband signals as described herein with respect to FIG. 3.

Operations of Local Oscillator Leakage Dodging

Figure 5:
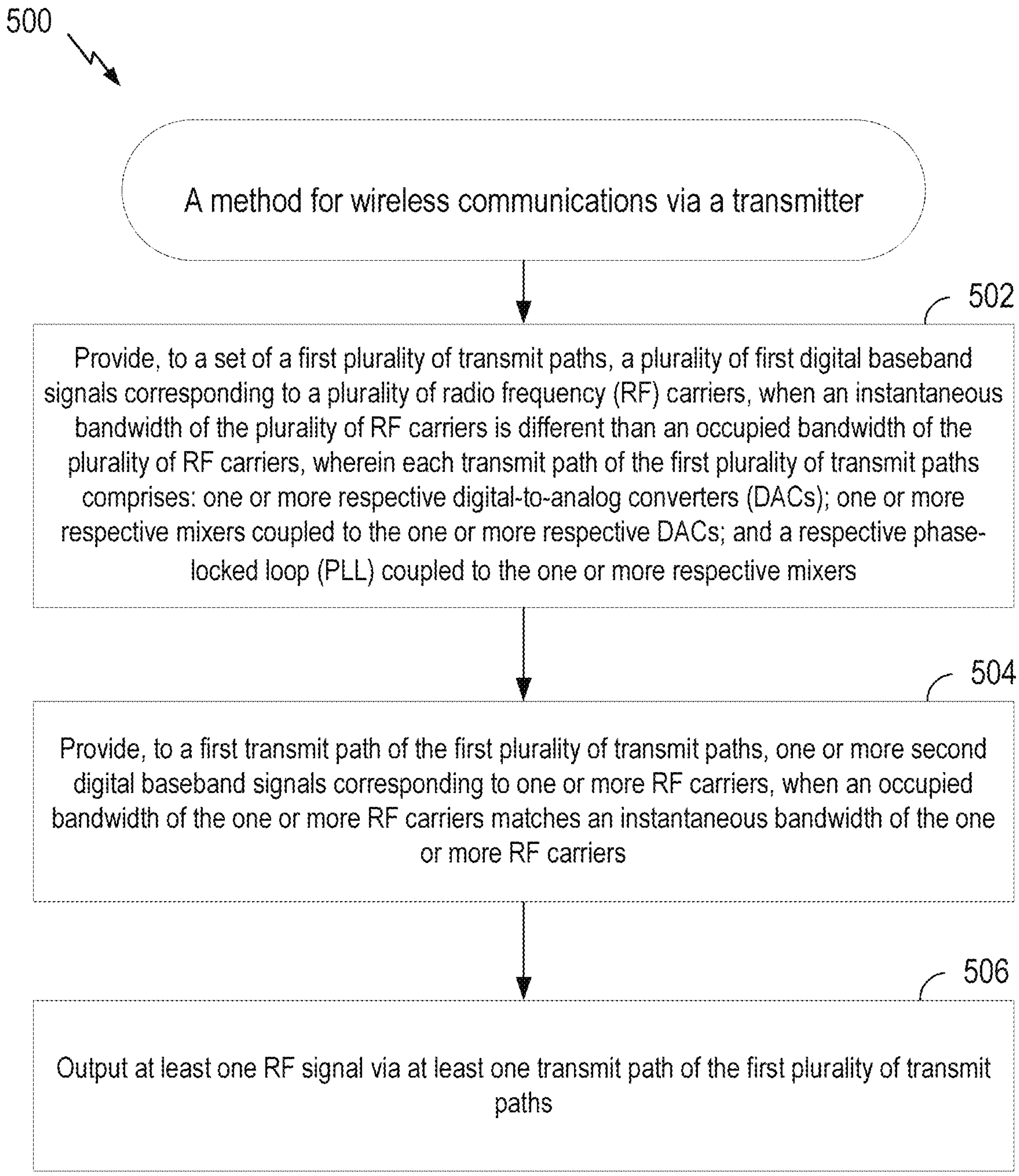
FIG. 5 depicts example operations for wireless communication.

FIG. 5 illustrates example operations 500 for wireless communication. The operations 500 may be performed, for example, by a wireless device (e.g., the first wireless device 102 in the wireless communications system 100) or an RF transmitter (e.g., the RF transmitter of FIG. 3). The operations 500 may be implemented as software components that are executed and run on one or more processors (e.g., the modem 210 and/or the processor 212 of FIG. 2). Further, the transmission and/or reception of signals by the wireless device in the operations 500 may be enabled, for example, by one or more antennas (e.g., the antenna 220 of FIG. 2). In certain aspects, the transmission and/or reception of signals by the wireless device may be implemented via a bus interface of one or more processors (e.g., the modem 210 and/or the processor 212 of FIG. 2) obtaining and/or outputting signals for reception or transmission.

The operations 500 may optionally begin, at block 502, where the transmitter may provide, to a set of a plurality of transmit paths (e.g., the transmit paths 302*a*, 302*b* of FIG. 3), a plurality of first digital baseband signals corresponding to a plurality of RF carriers, when an instantaneous bandwidth of the plurality of RF carriers is different than an occupied bandwidth of the plurality of RF carriers. In certain aspects, each transmit path of the plurality of transmit paths comprises: one or more respective DACs; one or more respective mixers coupled to the one or more respective DACs; and a respective PLL coupled to the one or more respective mixers, for example, as described herein with respect to FIG. 3. In certain aspects, the plurality of RF carriers comprises a first RF carrier and a second RF carrier, wherein a gap is arranged in a frequency domain between bandwidths of the first RF carrier and the second RF carrier. In certain aspects, providing the plurality of first digital baseband signals comprises providing, for each of the set of the plurality of transmit paths, one or more third digital baseband signals of the plurality of first digital baseband signals to the respective one or more DACs.

At block 504, the transmitter may provide, to a first transmit path (e.g., the first transmit path 302*a* of FIG. 3) of the plurality of transmit paths, one or more second digital baseband signals corresponding to one or more RF carriers, when an occupied bandwidth of the one or more RF carriers matches an instantaneous bandwidth of the one or more RF carriers. The one or more second digital baseband signals may be all of the digital baseband signals fed to the first transmit path for transmission of the RF signal(s).

At block 506, the transmitter may output at least one RF signal via at least one transmit path of the plurality of transmit paths. For example, the transmitter may output the at least one RF signal to one or more wireless communication devices (e.g., any of the second wireless devices 104 depicted in FIG. 1). The RF signal may carry or include any of various information, such as data and/or control information. In some cases, the RF signal may carry or include one or more packets or data blocks.

In certain aspects, at least one PLL of the plurality of transmit paths comprises an integer-N PLL. In certain aspects, at least one PLL of the plurality of transmit paths comprises a ring-oscillator-based PLL. In certain aspects, at least one PLL of the plurality of transmit paths comprises a sampling PLL.

The operations 500 may further include outputting, for each of the set of the plurality of transmit paths, a respective local oscillator signal in a different bandwidth of the plurality of RF carriers via the respective PLL.

The operations 500 may further include outputting, via the PLL of the first transmit path, a local oscillator signal in the occupied bandwidth of the one or more RF carriers.

The operations 500 may further include providing, via a frequency synthesizer, a signal at a reference frequency to at least one PLL of the plurality of transmit paths, wherein the frequency synthesizer is coupled to the at least one PLL of the plurality of transmit paths.

The operations 500 may further include generating a multi-carrier digital baseband signal based on a plurality of third digital baseband signals; and generating the plurality of first digital baseband signals based on the multi-carrier digital baseband signal. The operations 500 may further include performing multi-carrier DPD based on the multi-carrier digital baseband signal.

In certain aspects, each transmit path of the plurality of transmit paths further comprises a respective filter coupled between the one or more respective DACs and the one or more respective mixers.

Figure 6:
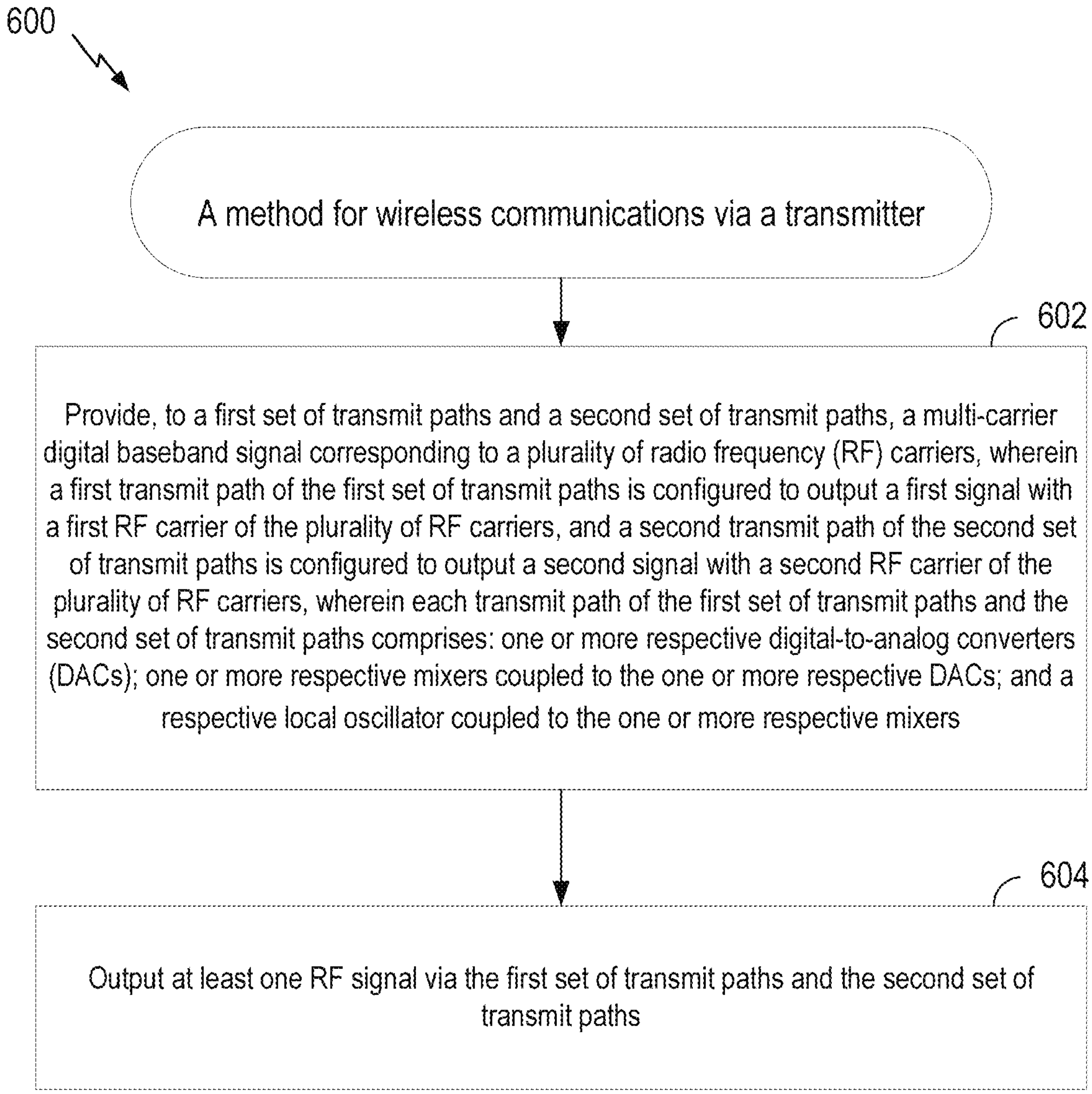
FIG. 6 depicts example operations for wireless communication.

FIG. 6 illustrates example operations 600 for wireless communications. The operations 600 may be performed, for example, by a wireless device (e.g., the first wireless device 102 in the wireless communications system 100) or an RF transmitter (e.g., the RF transmitter of FIG. 4). The operations 600 may be implemented as software components that are executed and run on one or more processors (e.g., the modem 210 and/or the processor 212 of FIG. 2). Further, the transmission and/or reception of signals by the wireless device in the operations 600 may be enabled, for example, by one or more antennas (e.g., the antenna 220 of FIG. 2). In certain aspects, the transmission and/or reception of signals by the wireless device may be implemented via a bus interface of one or more processors (e.g., the modem 210 and/or the processor 212 of FIG. 2) obtaining and/or outputting signals for reception or transmission.

The operations 600 may optionally begin, at block 602, where the transmitter may provide, to a first set of transmit paths (e.g., the first set of transmit paths 402*a* of FIG. 4) and a second set of transmit paths (e.g., the second set of transmit paths 402*b*), a multi-carrier digital baseband signal corresponding to a plurality of RF carriers, wherein a first transmit path of the first set of transmit paths is configured to output a first signal with a first RF carrier of the plurality of RF carriers, and a second transmit path of the second set of transmit paths is configured to output a second signal with a second RF carrier of the plurality of RF carriers, wherein each transmit path of the first set of transmit paths and the second set of transmit paths comprises: one or more respective DACs; one or more respective mixers coupled to the one or more respective DACs; and a respective local oscillator coupled to the one or more respective mixers.

At block 604, the transmitter may output at least one RF signal via the first set of transmit paths and the second set of transmit paths. For example, the transmitter may output the RF signal to one or more wireless communication devices (e.g., any of the second wireless devices 104 depicted in FIG. 1). The RF signal may carry or include any of various information, such as data and/or control information. In some cases, the RF signal may carry or include one or more packets or data blocks.

In certain aspects, the transmitter comprises an RF combiner (e.g., the RF power combiner 412) coupled between the first transmit path and the second transmit path.

In certain aspects, an instantaneous bandwidth of the plurality of RF carriers is different than an occupied bandwidth of the plurality of RF carriers.

In certain aspects, at least one local oscillator of the first set of transmit paths and the second set of transmit paths comprises a frequency divider.

The operations 600 may further include performing multi-carrier DPD based on the multi-carrier digital baseband signal.

The operations 600 may further include outputting, for each transmit path of the first set of transmit paths and the second set of transmit paths, a local oscillator signal in a different bandwidth of the plurality of RF carriers via the respective local oscillator.

In certain aspects, the transmitter comprises a first frequency synthesizer coupled to at least one local oscillator of the first set of transmit paths; and a second frequency synthesizer coupled to at least one local oscillator of the second set of transmit paths, for example, as described herein with respect to FIG. 4.

Aspects of the present disclosure may be applied to any of various wireless communications devices that may perform LO leakage dodging described herein, such as a UE, a base station, an access point, a wireless station, or the like.

Various components of the RF transmitter 300 may provide means for performing the operations 500 described with respect to FIG. 5, or any aspect related to operations described herein. Means for providing and/or means for outputting may include one or more processors, such as the modem 210 and/or processor 212 depicted in FIG. 2, and/or any of the respective elements of the RF transmitter 300 of FIG. 3.

Various components of the RF transmitter 400 may provide means for performing the operations 600 described with respect to FIG. 6, or any aspect related to operations described herein. Means for providing and/or means for outputting may include one or more processors, such as the modem 210 and/or processor 212 depicted in FIG. 2, and/or any of the respective elements of the RF transmitter 400 of FIG. 4.

Example Aspects

Implementation examples are described in the following numbered clauses:

Aspect 1: A transmitter, comprising: a plurality of transmit paths, wherein each transmit path of the plurality of transmit paths comprises: one or more respective digital-to-analog converters (DACs); one or more respective mixers coupled to the one or more respective DACs; and a respective phase-locked loop (PLL) coupled to the one or more respective mixers; one or more memories; and one or more processors coupled to the one or more memories, the one or more processors being configured to: provide, to a set of the plurality of transmit paths, a plurality of first digital baseband signals corresponding to a plurality of radio frequency (RF) carriers, when an instantaneous bandwidth of the plurality of RF carriers is different than an occupied bandwidth of the plurality of RF carriers; and provide, to a first transmit path of the plurality of transmit paths, one or more second digital baseband signals corresponding to one or more RF carriers, when an occupied bandwidth of the one or more RF carriers matches an instantaneous bandwidth of the one or more RF carriers.

Aspect 2: The transmitter of Aspect 1, wherein to provide the plurality of first digital baseband signals, the one or more processors are configured to provide, for each of the set of the plurality of transmit paths, one or more third digital baseband signals of the plurality of first digital baseband signals to the respective one or more DACs.

Aspect 3: The transmitter of Aspect 1 or 2, wherein at least one PLL of the plurality of transmit paths comprises an integer-N PLL or a ring-oscillator-based PLL.

Aspect 4: The transmitter according to any of Aspects 1-3, wherein at least one PLL of the plurality of transmit paths comprises a sampling PLL.

Aspect 5: The transmitter according to any of Aspects 1-4, wherein the plurality of transmit paths comprises a second transmit path, wherein the first transmit path is configured to output one or more first RF signals with a first peak bandwidth, and wherein the second transmit path is configured to output one or more second RF signals with a second peak bandwidth different from the first peak bandwidth.

Aspect 6: The transmitter according to any of Aspects 1-5, wherein the plurality of RF carriers comprises a first RF carrier and a second RF carrier, wherein a gap is arranged in a frequency domain between bandwidths of the first RF carrier and the second RF carrier.

Aspect 7: The transmitter according to any of Aspects 1-6, wherein, for each of the set of the plurality of transmit paths, the respective PLL is configured to output a respective local oscillator signal in a different bandwidth of the plurality of RF carriers.

Aspect 8: The transmitter according to any of Aspects 1-7, wherein the PLL of the first transmit path is configured to output a local oscillator signal in the occupied bandwidth of the one or more RF carriers.

Aspect 9: The transmitter according to any of Aspects 1-8, further comprising a frequency synthesizer coupled to at least one PLL of the plurality of transmit paths, wherein the frequency synthesizer is configured to provide a signal at a reference frequency to the at least one PLL.

Aspect 10: The transmitter according to any of Aspects 1-9, wherein the one or more processors are configured to: generate a multi-carrier digital baseband signal based on a plurality of third digital baseband signals; and generate the plurality of first digital baseband signals based on the multi-carrier digital baseband signal.

Aspect 11: The transmitter according to any of Aspects 1-10, wherein the one or more processors are configured to perform multi-carrier digital pre-distortion (DPD) based on the multi-carrier digital baseband signal.

Aspect 12: The transmitter according to any of Aspects 1-11, wherein each transmit path of the plurality of transmit paths further comprises a respective filter coupled between the one or more respective DACs and the one or more respective mixers.

Aspect 13: A transmitter, comprising: a first set of transmit paths; a second set of transmit paths, wherein each transmit path of the first set of transmit paths and the second set of transmit paths comprises: one or more respective digital-to-analog converters (DACs); one or more respective mixers coupled to the one or more respective DACs; and a respective local oscillator coupled to the one or more respective mixers, wherein the respective local oscillator is configured to output a local oscillator signal; one or more memories; and one or more processors coupled to the one or more memories, the one or more processors being configured to provide, to the first set of transmit paths and the second set of transmit paths, a multi-carrier digital baseband signal corresponding to a plurality of radio frequency (RF) carriers, wherein a first transmit path of the first set of transmit paths is configured to output a first signal with a first RF carrier of the plurality of RF carriers, and a second transmit path of the second set of transmit paths is configured to output a second signal with a second RF carrier of the plurality of RF carriers.

Aspect 14: The transmitter of Aspect 13, further comprising an RF combiner coupled between the first transmit path and the second transmit path.

Aspect 15: The transmitter of Aspect 13 or 14, wherein an instantaneous bandwidth of the plurality of RF carriers is different than an occupied bandwidth of the plurality of RF carriers.

Aspect 16: The transmitter according to any of Aspects 13-15, wherein at least one local oscillator of the first set of transmit paths and the second set of transmit paths comprises a frequency divider.

Aspect 17: The transmitter according to any of Aspects 13-16, wherein the one or more processors are configured to perform multi-carrier digital pre-distortion (DPD) based on the multi-carrier digital baseband signal.

Aspect 18: The transmitter according to any of Aspects 13-17, wherein, for each transmit path of the first set of transmit paths and the second set of transmit paths, the respective local oscillator is configured to output a local oscillator signal in a different bandwidth of the plurality of RF carriers.

Aspect 19: The transmitter according to any of Aspects 13-18, further comprising: a first frequency synthesizer coupled to at least one local oscillator of the first set of transmit paths; and a second frequency synthesizer coupled to at least one local oscillator of the second set of transmit paths.

Aspect 20: A method for wireless communications via a transmitter, comprising: providing, to a set of a plurality of transmit paths, a plurality of first digital baseband signals corresponding to a plurality of radio frequency (RF) carriers, when an instantaneous bandwidth of the plurality of RF carriers is different than an occupied bandwidth of the plurality of RF carriers, wherein each transmit path of the plurality of transmit paths comprises: one or more respective digital-to-analog converters (DACs); one or more respective mixers coupled to the one or more respective DACs; and a respective phase-locked loop (PLL) coupled to the one or more respective mixers; providing, to a first transmit path of the plurality of transmit paths, one or more second digital baseband signals corresponding to one or more RF carriers, when an occupied bandwidth of the one or more RF carriers matches an instantaneous bandwidth of the one or more RF carriers; and outputting at least one RF signal via at least one transmit path of the plurality of transmit paths.

Aspect 21: The method of Aspect 20, wherein providing the plurality of first digital baseband signals comprises providing, for each of the set of the plurality of transmit paths, one or more third digital baseband signals of the plurality of first digital baseband signals to the respective one or more DACs.

Aspect 22: The method of Aspect 20 or 21, wherein at least one PLL of the plurality of transmit paths comprises an integer-N PLL.

Aspect 23: The method according to any of Aspects 20-22, wherein at least one PLL of the plurality of transmit paths comprises a ring-oscillator-based PLL.

Aspect 24: The method according to any of Aspects 20-23, wherein at least one PLL of the plurality of transmit paths comprises a sampling PLL.

Aspect 25: The method according to any of Aspects 20-24, wherein the plurality of RF carriers comprises a first RF carrier and a second RF carrier, wherein a gap is arranged in a frequency domain between bandwidths of the first RF carrier and the second RF carrier.

Aspect 26: The method according to any of Aspects 20-25, further comprising outputting, for each of the set of the plurality of transmit paths, a respective local oscillator signal in a different bandwidth of the plurality of RF carriers via the respective PLL.

Aspect 27: The method according to any of Aspects 20-26, further comprising outputting, via the PLL of the first transmit path, a local oscillator signal in the occupied bandwidth of the one or more RF carriers.

Aspect 28: The method according to any of Aspects 20-27, further comprising providing, via a frequency synthesizer, a signal at a reference frequency to at least one PLL of the plurality of transmit paths, wherein the frequency synthesizer is coupled to the at least one PLL of the plurality of transmit paths.

Aspect 29: The method according to any of Aspects 20-28, further comprising: generating a multi-carrier digital baseband signal based on a plurality of third digital baseband signals; and generating the plurality of first digital baseband signals based on the multi-carrier digital baseband signal.

Aspect 30: The method according to any of Aspects 29-29, further comprising performing multi-carrier digital pre-distortion (DPD) based on the multi-carrier digital baseband signal.

Aspect 31: The method according to any of Aspects 20-30, wherein each transmit path of the plurality of transmit paths further comprises a respective filter coupled between the one or more respective DACs and the one or more respective mixers.

Aspect 32: A method for wireless communications via a transmitter, comprising: providing, to a first set of transmit paths and a second set of transmit paths, a multi-carrier digital baseband signal corresponding to a plurality of radio frequency (RF) carriers, wherein a first transmit path of the first set of transmit paths is configured to output a first signal with a first RF carrier of the plurality of RF carriers, and a second transmit path of the second set of transmit paths is configured to output a second signal with a second RF carrier of the plurality of RF carriers, wherein each transmit path of the first set of transmit paths and the second set of transmit paths comprises: one or more respective digital-to-analog converters (DACs); one or more respective mixers coupled to the one or more respective DACs; and a respective local oscillator coupled to the one or more respective mixers; and outputting at least one RF signal via the first set of transmit paths and the second set of transmit paths.

Aspect 33: The method of Aspect 32, wherein the transmitter comprises an RF combiner coupled between the first transmit path and the second transmit path.

Aspect 34: The method of Aspect 32 or 33, wherein an instantaneous bandwidth of the plurality of RF carriers is different than an occupied bandwidth of the plurality of RF carriers.

Aspect 35: The method according to any of Aspects 32-34, wherein at least one local oscillator of the first set of transmit paths and the second set of transmit paths comprises a frequency divider.

Aspect 36: The method according to any of Aspects 32-35, further comprising performing multi-carrier digital pre-distortion (DPD) based on the multi-carrier digital baseband signal.

Aspect 37: The method according to any of Aspects 32-36, further comprising outputting, for each transmit path of the first set of transmit paths and the second set of transmit paths, a local oscillator signal in a different bandwidth of the plurality of RF carriers via the respective local oscillator.

Aspect 38: The method according to any of Aspects 32-37, wherein the transmitter comprises: a first frequency synthesizer coupled to at least one local oscillator of the first set of transmit paths; and a second frequency synthesizer coupled to at least one local oscillator of the second set of transmit paths.

Aspect 39: An apparatus, comprising: a memory; and one or more processors configured to perform a method in accordance with any of Aspects 20-38.

Aspect 40: An apparatus, comprising means for performing a method in accordance with any of Aspects 20-38.

Aspect 41: A non-transitory computer-readable medium comprising computer-executable instructions that, when executed by one or more processors of a processing system, cause the processing system to perform a method in accordance with any of Aspects 20-38.

Aspect 42: A computer program product embodied on a computer-readable storage medium comprising code for performing a method in accordance with any of Aspects 20-38.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a microcontroller, a microprocessor, a general purpose processor, an artificial intelligence (AI) processor, a digital signal processor (DSP), an ASIC, a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), a system in package (SiP), or any other such configuration.

As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term “determining” encompasses a wide variety of actions. For example, “determining” may include calculating, computing, processing, deriving, investigating, looking up (e.g., looking up in a table, a database or another data structure), ascertaining and the like. Also, “determining” may include receiving (e.g., receiving information), accessing (e.g., accessing data in a memory) and the like. Also, “determining” may include resolving, selecting, choosing, establishing and the like.

As used herein, “coupled to” and “coupled with” generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather “one or more.” The subsequent use of a definite article (e.g., “the” or “said”) with an element (e.g., “the processor”) is not intended to invoke a singular meaning (e.g., “only one”) on the element unless otherwise specifically stated. For example, reference to an element (e.g., “a processor,” “a controller,” “a memory,” “a transceiver,” “an antenna,” “the processor,” “the controller,” “the memory,” “the transceiver,” “the antenna,” etc.), unless otherwise specifically stated, should be understood to refer to one or more elements (e.g., “one or more processors,” “one or more controllers,” “one or more memories,” “one more transceivers,” etc.). The terms “set” and “group” are intended to include one or more elements, and may be used interchangeably with “one or more.” Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term “some” refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

The invention claimed is:

1. A transmitter, comprising:

a plurality of transmit paths, wherein each transmit path of the plurality of transmit paths comprises:

one or more respective digital-to-analog converters (DACs);

one or more respective mixers coupled to the one or more respective DACs; and a respective phase-locked loop (PLL) coupled to the one or more respective mixers;

one or more memories; and one or more processors coupled to the one or more memories, the one or more processors being configured to:

provide, to a set of the plurality of transmit paths, a plurality of first digital baseband signals corresponding to a plurality of radio frequency (RF) carriers, when an instantaneous bandwidth of the plurality of RF carriers is different than an occupied bandwidth of the plurality of RF carriers; and provide, to a first transmit path of the plurality of transmit paths, one or more second digital baseband signals corresponding to one or more RF carriers, when an occupied bandwidth of the one or more RF carriers matches an instantaneous bandwidth of the one or more RF carriers.

2. The transmitter of claim 1, wherein to provide the plurality of first digital baseband signals, the one or more processors are configured to provide, for each of the set of the plurality of transmit paths, one or more third digital baseband signals of the plurality of first digital baseband signals to the respective one or more DACs.

3. The transmitter of claim 1, wherein at least one PLL of the plurality of transmit paths comprises an integer-N PLL or a ring-oscillator-based PLL.

4. The transmitter of claim 1, wherein at least one PLL of the plurality of transmit paths comprises a sampling PLL.

5. The transmitter of claim 1, wherein the plurality of transmit paths comprises a second transmit path, wherein the first transmit path is configured to output one or more first RF signals with a first peak bandwidth, and wherein the second transmit path is configured to output one or more second RF signals with a second peak bandwidth different from the first peak bandwidth.

6. The transmitter of claim 1, wherein the plurality of RF carriers comprises a first RF carrier and a second RF carrier, wherein a gap is arranged in a frequency domain between bandwidths of the first RF carrier and the second RF carrier.

7. The transmitter of claim 1, wherein, for each of the set of the plurality of transmit paths, the respective PLL is configured to output a respective local oscillator signal in a different bandwidth of the plurality of RF carriers.

8. The transmitter of claim 1, wherein the PLL of the first transmit path is configured to output a local oscillator signal in the occupied bandwidth of the one or more RF carriers.

9. The transmitter of claim 1, further comprising a frequency synthesizer coupled to at least one PLL of the plurality of transmit paths, wherein the frequency synthesizer is configured to provide a signal at a reference frequency to the at least one PLL.

10. The transmitter of claim 1, wherein the one or more processors are configured to:

generate a multi-carrier digital baseband signal based on a plurality of third digital baseband signals; and generate the plurality of first digital baseband signals based on the multi-carrier digital baseband signal.

11. The transmitter of claim 10, wherein the one or more processors are configured to perform multi-carrier digital pre-distortion (DPD) based on the multi-carrier digital baseband signal.

12. The transmitter of claim 1, wherein each transmit path of the plurality of transmit paths further comprises a respective filter coupled between the one or more respective DACs and the one or more respective mixers.

13. A transmitter, comprising:

a first transmit path;

a second transmit path, wherein each of the first transmit path and the second transmit path comprises:

one or more respective digital-to-analog converters (DACs);

one or more respective mixers coupled to the one or more respective DACs; and a respective local oscillator coupled to the one or more respective mixers, wherein the respective local oscillator is configured to output a local oscillator signal;

one or more memories; and one or more processors coupled to the one or more memories, the one or more processors configured to generate a multi-carrier digital baseband signal corresponding to a plurality of radio frequency (RF) carriers including a first RF carrier and a second RF carrier and further configured to:

in a first mode corresponding to an instantaneous bandwidth of the plurality of RF carriers being different than an occupied bandwidth of the plurality of RF carriers, provide, to the first transmit path and the second set of transmit path, the multi-carrier digital baseband signal, wherein the first transmit path is configured to output a first signal with the first RF carrier of the plurality of RF carriers, and the second transmit path is configured to output a second signal with the second RF carrier of the plurality of RF carriers; and in a second mode, corresponding to the instantaneous bandwidth of the plurality of RF carriers matching the occupied bandwidth of the plurality of RF carriers, provide the multi-carrier digital baseband signal to the first transmit path, wherein the first transmit path is configured to output a third signal with the first RF carrier of the plurality of RF carriers and the second RF carrier of the plurality of RF carriers.

14. The transmitter of claim 13, further comprising an RF combiner coupled between the first transmit path and the second transmit path.

15. The transmitter of claim 13, wherein the respective local oscillator of the first transmit path and the second transmit path comprises a frequency divider.

16. The transmitter of claim 13, wherein the one or more processors are configured to perform multi-carrier digital pre-distortion (DPD) based on the multi-carrier digital baseband signal.

17. The transmitter of claim 13, wherein, in the first mode: the respective local oscillator of the first transmit path is configured to output the local oscillator signal in a bandwidth of the first RF carrier, and the respective local oscillator of the second transmit path is configured to output the local oscillator signal in a bandwidth of the second RF carrier.

18. The transmitter of claim 13, further comprising:

a first frequency synthesizer coupled to the respective local oscillator of the first transmit path; and a second frequency synthesizer coupled to the respective local oscillator of the second transmit path.

19. The transmitter of claim 13, wherein, in the second mode, the respective local oscillator of the first transmit path is configured to output the local oscillator signal in the occupied bandwidth of the plurality of RF carriers.

20. A method for wireless communications via a transmitter, comprising:

providing, to a set of a plurality of transmit paths, a plurality of first digital baseband signals corresponding to a plurality of radio frequency (RF) carriers, when an instantaneous bandwidth of the plurality of RF carriers is different than an occupied bandwidth of the plurality of RF carriers, wherein each transmit path of the plurality of transmit paths comprises: one or more respective digital-to-analog converters (DACs); one or more respective mixers coupled to the one or more respective DACs; and a respective phase-locked loop (PLL) coupled to the one or more respective mixers;

providing, to a first transmit path of the plurality of transmit paths, one or more second digital baseband signals corresponding to one or more RF carriers, when an occupied bandwidth of the one or more RF carriers matches an instantaneous bandwidth of the one or more RF carriers; and outputting at least one RF signal via at least one transmit path of the plurality of transmit paths.

* * * * *